United States Patent
Stibel et al.

(10) Patent No.: US 10,007,955 B2
(45) Date of Patent: Jun. 26, 2018

(54) BASE-BUSINESS CARDS

(71) Applicant: DUN & BRADSTREET EMERGING BUSINESSES CORP., Malibu, CA (US)

(72) Inventors: Jeffrey M. Stibel, Malibu, CA (US); Judith G. Hackett, Malibu, CA (US); Chad Michael Buechler, Los Angeles, CA (US); Brandon Mills, Redondo Beach, CA (US)

(73) Assignee: DUN & BRADSTREET EMERGING BUSINESSES CORP., Malibu, CA (US)

( * ) Notice: Subject to any disclaimer, the term of this patent is extended or adjusted under 35 U.S.C. 154(b) by 0 days. days.

(21) Appl. No.: 14/522,422

(22) Filed: Oct. 23, 2014

(65) Prior Publication Data

US 2016/0117782 A1    Apr. 28, 2016

(51) Int. Cl.
  *G06Q 10/00*  (2012.01)
  *G06Q 50/00*  (2012.01)
  *G06F 3/0482*  (2013.01)
  *G06F 3/0483*  (2013.01)
  *G06F 3/0488*  (2013.01)

(52) U.S. Cl.
  CPC ........... *G06Q 50/01* (2013.01); *G06F 3/0482* (2013.01); *G06F 3/0483* (2013.01); *G06F 3/04883* (2013.01)

(58) Field of Classification Search
  None
  See application file for complete search history.

(56) References Cited

U.S. PATENT DOCUMENTS

| | | | |
|---|---|---|---|
| 7,606,810 B1* | 10/2009 | Jeavons | |
| 2002/0035556 A1* | 3/2002 | Shah et al. | 707/1 |
| 2003/0126051 A1* | 7/2003 | Salim | 705/35 |
| 2010/0095234 A1* | 4/2010 | Lane | G06F 3/0416 715/773 |
| 2011/0307411 A1* | 12/2011 | Bolivar et al. | 705/347 |
| 2012/0290601 A1* | 11/2012 | Huang | 707/769 |

(Continued)

OTHER PUBLICATIONS

"Apple CEO Steve Jobs Unveils New Products at WWDC Show". CEO Wire. Waltham, Jun. 10, 2011.*

(Continued)

*Primary Examiner* — Gabrielle A McCormick
(74) *Attorney, Agent, or Firm* — Ohlandt, Greeley, Ruggiero & Perle, L.L.P.

(57) ABSTRACT

Some embodiments provide a system that generates different customized decks of cards with each deck being customized for a different user with a condensed and filtered set of business data that is relevant to that user. The customizations are based in part on monitored user behavior and user interactions with the cards. Cards identifying businesses that the user has viewed for the most amount of time, recommended to others, approved, or positively reviewed or rated are assigned high values. Cards identifying businesses that the user has viewed for the least amount of time, rejected, or negatively reviewed or rated are assigned low values. The system then continually updates the deck to remove cards identifying business with the lowest values while adding cards identifying businesses that resemble other businesses with assigned high values.

6 Claims, 11 Drawing Sheets

(56) References Cited

U.S. PATENT DOCUMENTS

| | | | |
|---|---|---|---|
| 2013/0167088 A1* | 6/2013 | Mangum | G06F 3/0488 715/815 |
| 2013/0185753 A1* | 7/2013 | Kliot | 725/39 |
| 2014/0280890 A1* | 9/2014 | Yi et al. | 709/224 |

OTHER PUBLICATIONS

Lu, Hao and Yang Li. ("Gesture Coder: A Tool for Programming Multi-Touch Gestures by Demonstration". CHI'12, May 5-10, 2012, Austin, Texas, USA).*

* cited by examiner

700

Registration Interface
Username: ABCD     Password: ******

Identify businesses that you are interested in viewing:
- Industry – Enter SIC/NAICS code _____ or select from listing below:

| + Agriculture | + Utilities | + Construction | + Wholesale Trade | + Retail |
|---|---|---|---|---|
| + Transportation | + Real Estate | + Science and Tech. | + Education | + Health Care |
| + Entertainment | + Public Admin. | | | |

- Geographic region

| State: CA | - City | | |
|---|---|---|---|
| | o Bakersfield | o Los Angeles | o ... |
| | o Sacramento | o San Francisco | |
| | o San Diego | o San Jose | |

Revenue: _____
Size: _____
Number of locations: _____
Number of Employees: _____
Public company: Y/N
Average Rating: _____

710

Select Business Personnel that you are interested in viewing:

| o CEO | o Directors | o CFO | o VPs | o COO |
|---|---|---|---|---|
| o Board Members | o ... | | | |

720

Select Objective Business Data that you are interested in viewing:

| o Revenue | o Credit Score | o Years in Business | o Employee # | o Avail. Credit |
|---|---|---|---|---|
| o Imagery | o Industry | o Sector | o Partners | o Suppliers |
| o Email | o Telephone # | o Address | o URL | o ... |

Select Objective Personnel Data that you are interested in viewing:

| o Experience | o Education | o Expertise | o Accreditations | o Credit Score |
|---|---|---|---|---|
| o Role | o Team Members | o Contact Info. | o Superiors | o ... |

730

Select Subjective Data that you are interested in viewing:

| o Credibility Score | o Reviews | o Ratings | o Social Media | o ... |
|---|---|---|---|---|

FIG. 7

BASE-BUSINESS CARDS

TECHNICAL FIELD

The present invention pertains to a system that creates a card deck that customizes the presentation of business information on a per user basis.

BACKGROUND

Information overloading occurs when a user is inundated with too much information about a topic of interest and when the desired information is obfuscated within multiple layers of abstraction. Yet, websites and applications are increasingly overloading their users because of the abundance and ease of acquiring and transmitting data over digital networks and because the additional information is often seen as a means with which one site provides differentiated or value added services relative to another site.

Search engine interaction provides one example of information overloading. When a user submits a search engine query, the search engine returns thousands, if not, millions of results that may be relevant to the user query. Already the user is overloaded with information. The user is not provided the sought after data in response to the search engine query. Rather, the user is given links to other sites. Thus, there is at least one layer of abstraction between the user and the desired data. In order for the user to obtain the desired data, the user has to select individual links to then retrieve a page or site that may or may not contain the sought after data. Yet, clicking on a link does not resolve the information overloading problem, and in many cases, can serve to exacerbate it. The presented page or site, may contain the sought after data, but it is more likely than not, that the page or site contains additional data, advertisements, graphics, media content, etc. that is extraneous or unrelated to the user query. In other words, the page or site is not customized for the visiting user. As a result, user sifts through the provided information in order to identify the data that is pertinent to the user. Thereafter, the user can begin to consume the data.

These same issues exist in the dissemination and consumption of objective and subjective business data. Objective business data is typically provided as financial reports and credit reports. These include several indicators, scores, and other data which convey sought after data in an information overloading manner. Similarly, subjective business data is also provided in an overloading manner. In most cases, review aggregation sites that provide subjective business data in the form of reviews and ratings mirror search engine operation. In response to a user query, a review aggregator site often presents a listing of businesses that match the user query, such that the user then has to select each business one-by-one in order to retrieve the subjective business data about that business and, when the subjective business data is presented, it is presented the same for all users with little to no per user customization. Thus, it is up to the user to sift through the presented data in order to identify the data that is sought after by the user.

More and more users are shifting from the "big" data paradigm to a "now" data paradigm, whereby users expect answers that are directly responsive to queries without intermediary layers of abstraction separating the user from the sought after data and without the inclusion of any extraneous or irrelevant data with the sought after data. If a user does not immediately receive the sought after data in an easily consumable means, then the user is likely to disengage and go elsewhere to obtain the data.

Accordingly, there is a need to provide objective and subjective business data in a manner that adheres to the "now" data paradigm. More specifically, there is a need to condense and format relevant business data and provide a presentation of that data that is customized for and directly responsive to the user. There is a need to remove any abstraction layers that separate the user from the sought after data. There is further a need to remove extraneous data that would have to be filtered by the user in order to arrive at and consume the sought after data.

SUMMARY OF THE INVENTION

It is an objective to present business data in a condensed and customized manner so as to facilitate rapid data consumption by users and further facilitate rapid decision making by the users. To achieve these and other objectives, some embodiments implement a system that produces a customized business card deck for different users with each user deck being customized to include cards that identify businesses and business personnel that are of interest to that user and with each card in the user deck identifying a subset of objective and subjective business data that is of most interest to that user. The cards can be embodied on either a physical or digital medium.

The system assigns a value to each card based on aggregate monitored user behavior and interactions with the cards. The system then adjusts the card values for each particular user deck based on monitored behavior and interactions by that particular user and optionally, by friends, partners, or associates of the user. The adjusted card values determine the relevance of the card to each user with the values serving as the basis with which the system determines which cards should be included in which user decks.

The system first derives a default value for each card. The default card value is assigned based on the collective behavior users demonstrate with respect to a card, the collective interactions that the users have with the card, the amount of data that is available for the business or business representative identified by the card, and the verified status of the available data. In some embodiments, the collective user behavior is derived from collective user viewership for each card. The system increases the default value of a particular card the more time users spend viewing that particular card relative to other cards. In some embodiments, the collective user interactions are derived by monitoring how many users approve or reject a particular card. Each user rejection of a card decreases its default value and each user approval of a card increases its default value.

A card can be rejected by an affirmative user interaction with that card such as the user disliking the business or business representative identified by the card or the user providing a negative review or rating for the business or business representative identified by the card. User approval of a card can be conveyed in several ways including endorsing or liking a business or business representative identified by a card, referring the card to another user, entering the card to a private user directory, and providing a positive review or rating for the business or business representative identified by the card.

In order to customize a deck for a specific user and select the cards identifying businesses that are most relevant for that specific user, the system adjusts the default values based on the specific user's behavior, interactions, and preferences. As a result, each card deck presented to each user will be customized to include cards that identify the businesses that are most relevant to the specific user. For example, the system uses the adjusted values to select cards for the user's deck that identify businesses that are most similar to the ones that a particular user has spent the most time viewing, has recommended to others, or has included within the user's private directory or favorites list while removing cards that identify businesses that the user has rejected even though some of the removed cards have high default values. The system can also use the adjusted values to prioritize the order with which the cards from a user deck are presented. In some embodiments, the system further adjusts the card values for a given user based on behavior, interactions, and preferences of that user's associates, friends, or partners. The system continually updates each user's deck of cards based on changing adjusted card values that result from continued monitoring the user's behavior and card interactions.

A user's private directory stores the cards that the user wishes to retain for future reference. This can include storing cards that contain business data that the user accesses most frequently. It can also include storing cards for preferred businesses that the user endorses, wishes to engage with again, or recommends to others. By flipping through the cards in the private directory, the user can access the information without the need to search or query for the information. The cards can also be swapped and passed to other businesses or across various online service providers in order to serve as recommendations or referrals. In some embodiments, the private directory can be organized to subdirectories.

In some embodiments, the system issues alerts to notify a user that the information of various cards within the user deck has been updated. Specifically, alerts can be issued whenever a card in the user's private directory, an approved or liked card, or a card previously viewed by the user is updated.

BRIEF DESCRIPTION OF THE DRAWINGS

In order to achieve a better understanding of the nature of the present invention, a preferred embodiment will now be described, by way of example only, with reference to the accompanying drawings in which:

FIG. 7 presents an exemplary interface with which a user can specify user customizations for the businesses or business personnel and the objective and subjective data that the user is interested in.

DETAILED DESCRIPTION OF THE INVENTION

Figure 1:
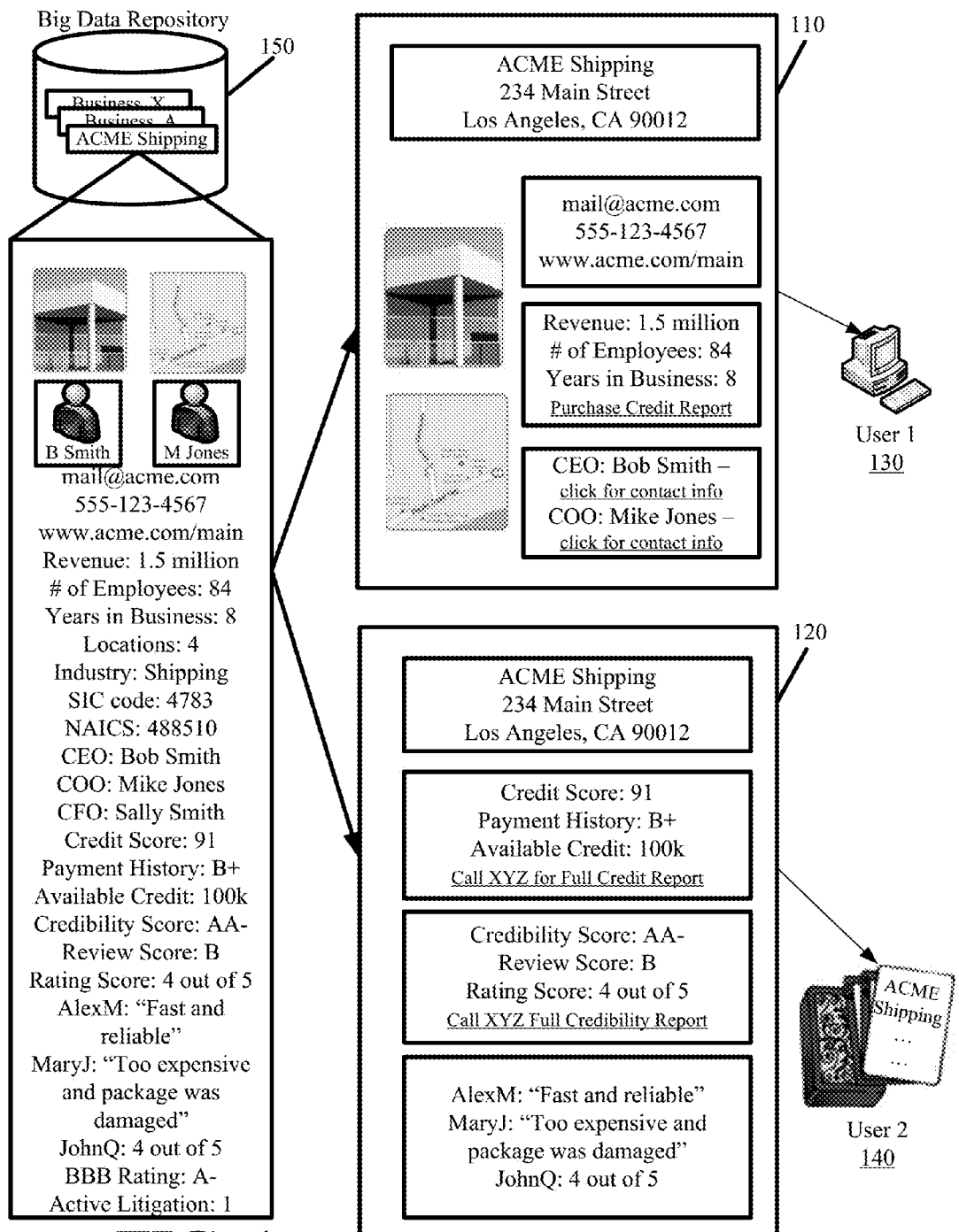
FIG. 1 presents two base-business cards that convey different objective and subjective business data for the same particular business to different users in accordance with some embodiments.

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described.

Described herein is a system that produces customized decks of "base-business" cards for different users. The cards of each user deck are customized to identify businesses or business personnel that are of interest to the user with each card in the deck presenting for the identified business or business representative, a condensed and filtered subset of available objective and subjective business data from a "big data" repository that is most relevant to that user while excluding other available but extraneous business data. In so doing, each deck condenses "big data" into a set of "now data" that is customized on a per user basis, wherein the "now data" presented through a particular user's deck provides a custom set of business data about a custom set of businesses or business personnel that the particular user is most interested in. The term business personnel is in reference to any individual that acts in a representative capacity for a given business. A business representative can include a principal, executive, board member, manager, or other agent of a business.

The "big data" repository from which the card data is sourced can be maintained and operated by the system of some embodiments or can be sourced from one or more third-party data sources. Different data sources can provide the objective and subjective business data for the big data repository. For example, the objective business data can originate from a credit reporting agency, whereas the subjective business data can originate from a review aggregation site. In any case, the term big data repository is in reference to any one or more data sources that contain numerous data points on businesses and business personnel, whereby the presentation of all the data points compiled for a business or business representative would result in the above described information overloading inefficiencies.

The system itself is implemented by one or more machines, such as those described below with reference to FIG. 11, and by operation of one or more processors. Such a system is beyond manual implementation because of the distributed, continuous, and remote monitoring that enables the per user customizations of each deck.

Objective business data can be in reference to information that trusted or reliable sources disseminate about a target business, business personnel, or different aspects of the target business or target business representative including operation, finances, identification, and performance. Some specific examples of objective data that can be selectively included in a card deck for a particular business include photographs or images of the particular business, contact information (e.g., mailing address, email address, website Uniform Resource Locator (URL), and telephone number), number of employees, revenue, years in business, number of locations, credit score, and industry classification. Some sources for objective business data include financial reports provided by lenders, audited public disclosures provided by the business, and credit reports from credit reporting agencies. Other objective business data sources include the business's website, governmental databases, data verification services, and directories.

Subjective business data includes posts or messages that express sentiment about a target business, business personnel, or various aspects relating to the target business or business representative including operation, identification, and performance. The subjective data includes reviews and ratings that various third parties post about their experiences with various target businesses and business personnel. The subjective data can also include Facebook messages and Twitter tweets as well as editorial or commentary published online. Subjective business data can be sourced from various review and rating aggregation sites as well as social media sites.

The base-business cards are embodied in any of a physical and digital medium. In other words, the cards can be printed on paper or presented through a display of a user device including any of a smartphone, tablet, laptop computer, desktop computer, or other machine with a display and network connectivity.

FIG. 1 presents two base-business cards 110 and 120 that convey different objective and subjective business data for the same particular business to different users 130 and 140 in accordance with some embodiments. As shown, the business data for each of the cards 110 and 120 is sourced from a "big data" repository 150. Each card is produced with only a customized subset of the business data that is stored for the particular business in the repository 150.

The first card 110 is provided through a digital medium to the first user 130 so that the first user 130 can view the card 110 using any electronic device. The system customizes the business data that is included in the first card 10 according to preferences, monitored behavior, and card interactions of the first user 130. The preferences, monitoring, and interactions determines the subset of data that is most relevant to the first user 130. As shown, the first card 110 includes an image of the business, contact information, and operational information including the size and number of years the business has been operation. The big data repository 150 from which the first card 130 is created contains numerous other objective and subjective business data that would only serve to overload the first user. However, the system has determined that the extraneous data is not relevant or desired by the first user 130.

The second card 120 is embodied in a physical medium such as a printed card. The second card 120 is customized for the second user 140 based on preferences specified by the second user 140 and card interactions of the second user 140. In this case, the preferences and card interactions differ from those of the first user 140. Accordingly, the system produces the second card 120 with a different subset of business data for the particular business from the repository 150 than used in producing the first card 110. The second card 120 includes some contact information, but omits the image and operational information from the first card 110. Instead, the second card 120 provides objective business data relating to the business's creditworthiness and subjective business data relating to the business's credibility. More specifically, the second card 120 includes the business's credit score, payment history, available credit, recent user reviews, and overall rating of the business.

In some embodiments, the cards 110 and 120 also include external links or additional information with which the users 130 and 140 can obtain additional business data that is not present in the cards 110 and 120. For example, the links embedded in the first card 110 can access a full credit report for the business at issue or can be used for secondary functionality such as initiating a call with the business identified by the card.

A base-business card can also present data about business personnel. Such cards may populate a user deck when the user has expressed interest in identifying or learning about business personnel in addition to or instead of identifying or learning about different businesses.

Figure 2:
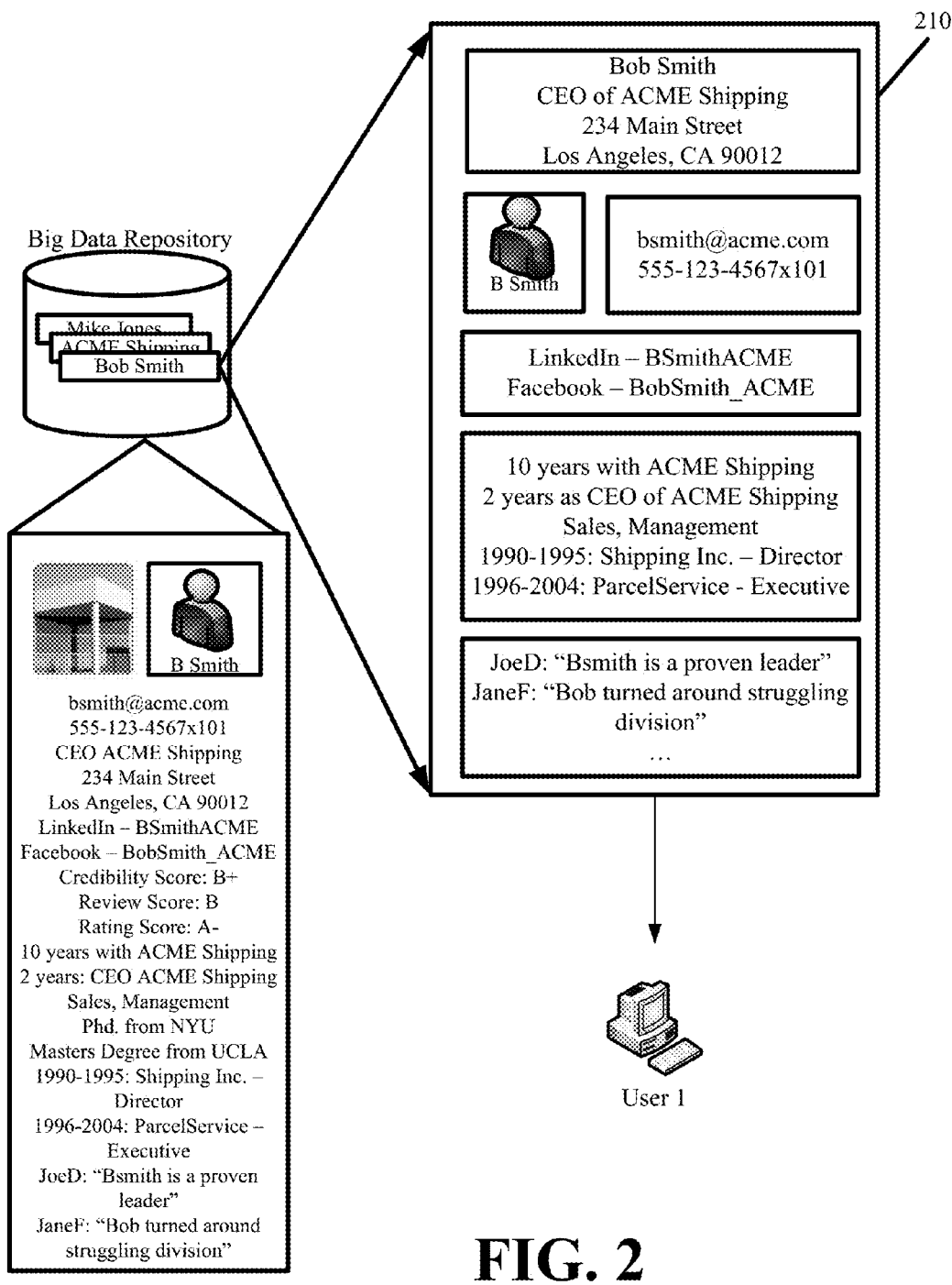
FIG. 2 illustrates a base-business card for a business representative in accordance with some embodiments.

FIG. 2 illustrates a base-business card 210 for a business representative in accordance with some embodiments. The card 210 provides identifying information about the business representative including the business representative's name, role in a particular business, and contact information with respect to the representative's role in the business. The contact information can include social media handles or usernames. Additional identifying information including the number of years the representative has been with the company, specialties, and prior experience. Subjective data can include reviews or posts that others have written about the business representative and may include other credibility related information (e.g., credibility scores). Again, the data presented in the card 210 is customized to include only a subset of available data from the big data repository based on the viewing user's preferences, monitored behavior, and card interactions.

The base-business cards model how baseball cards provide a condensed and readily consumable and identifiable set of information. However, the system furthers the concepts by customizing which cards are included in each user's deck and the business data included in each card on a per user basis. In so doing, the system avoids the pitfalls of information overloading and provides a platform whereby users can obtain the business data they desire with minimal interaction, search, analysis, and parsing. The data they desire is presented in a direct and condensed fashion and is continually pruned to disregard irrelevant or undesired data. Specifically, users can flip from one card to another with each flip immediately presenting the relevant information for the business or business personnel associated with the current card. In so doing, the user avoids having to perform a search, individually select search results, and manually filter the data provided with each selection in order to arrive at and consume the data that is of interest to the user.

Figure 3:
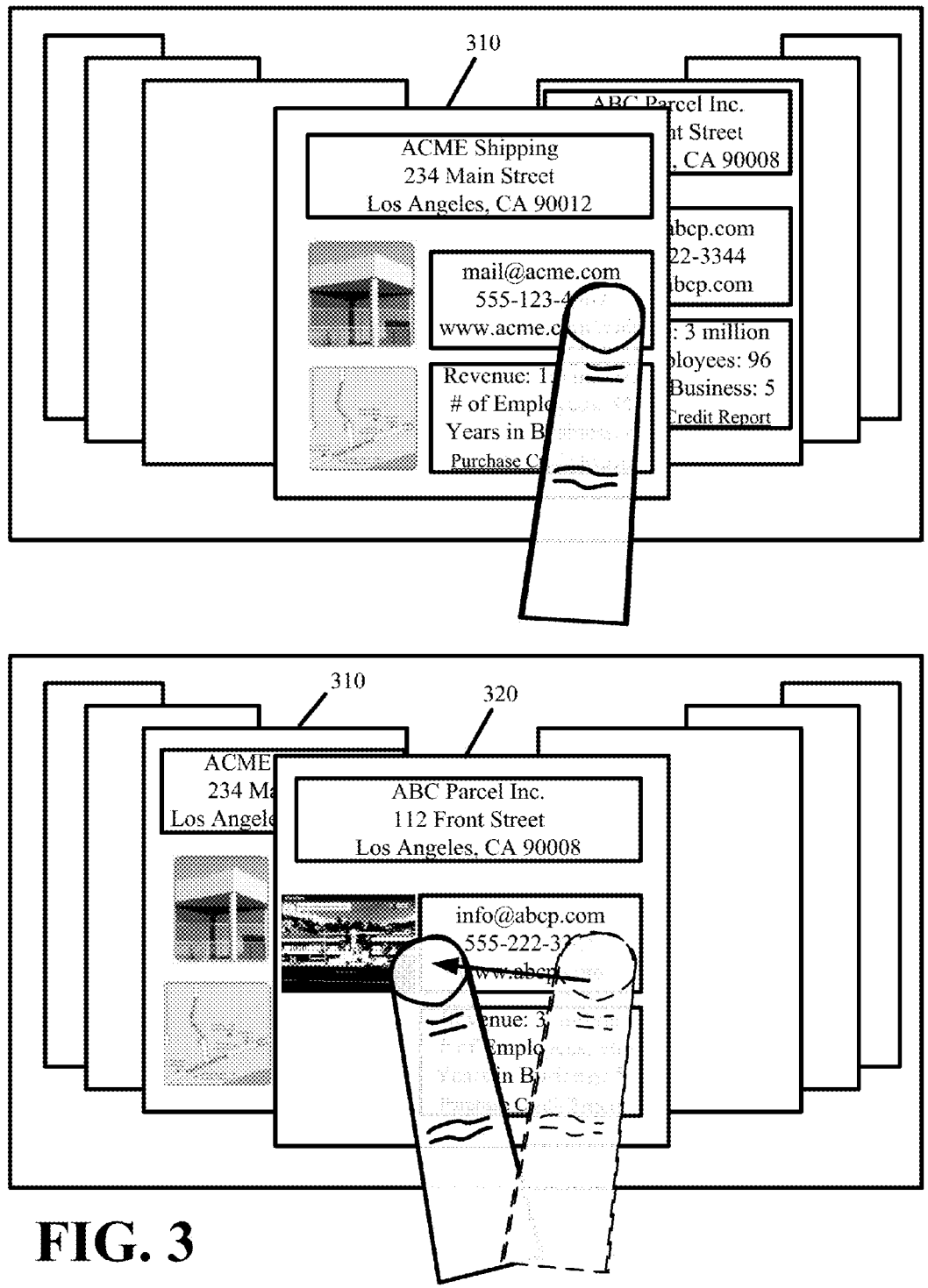
FIGS. 3-5 illustrate interacting with the base-business cards in accordance with some embodiments.
Figure 4:
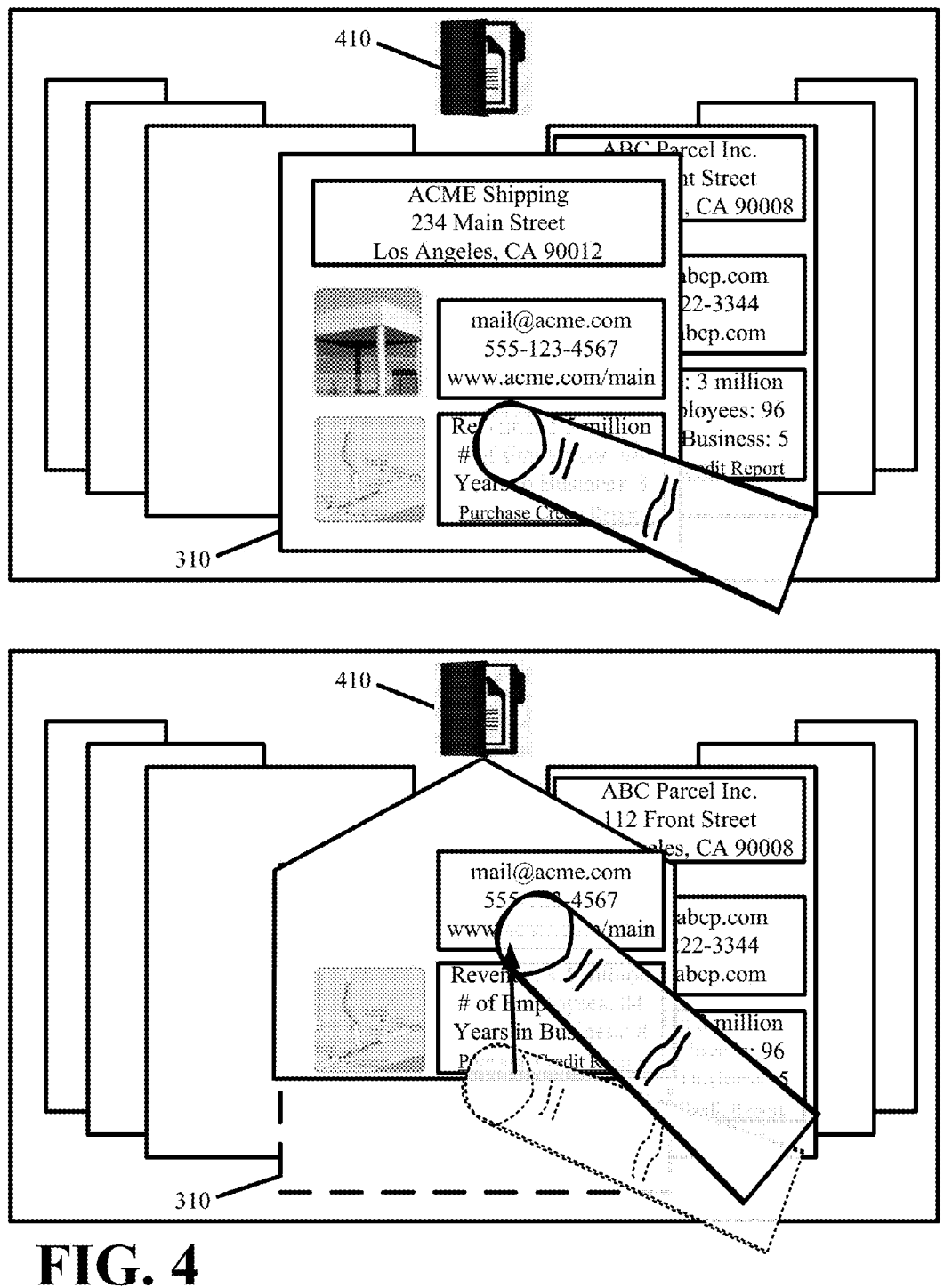
Figure 5:
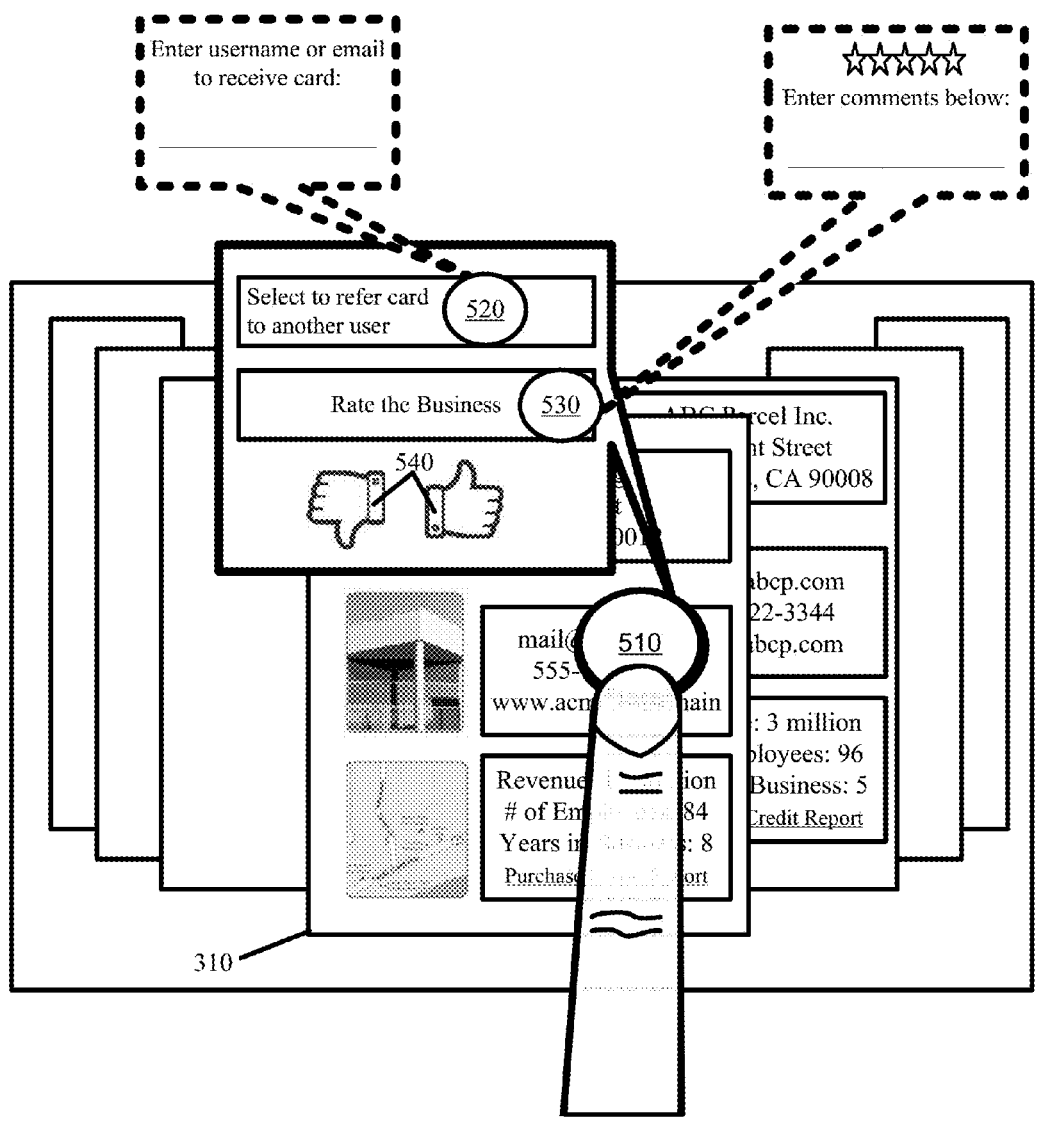

FIGS. 3-5 illustrate interacting with the base-business cards in accordance with some embodiments. These figures illustrate interactions that are performed on an application or website that is run on a touch-input device. Similar interactions can be input using keyboard, mouse, or other input devices.

As shown in FIG. 3, the display presents a first base-business card 310 at the center of the screen with other cards in the user customized deck presented to the right and left. The first card 310 provides a base set of business data about a first business, wherein the base set of information is customized for the user performing the interactions and the presented deck of cards is also customized for the user based on registration information provided by the user and past behavior will be explained below.

In FIG. 3, the user touches the first card and flicks to the left in order to advance to the next card in the user deck. In response to the flick, the screen changes from presenting the first card 310 to a second card 320 providing a base set of information about a second business. In this manner, the user can quickly consume a condensed and custom set of business data that is relevant to the user without having to select a link from a set of search results and without having to sort through superfluous data when each card is presented.

In FIG. 4, the user flicks the first card 310 up in order to enter the first card into the user's private directory 410. The user's private directory 410 stores cards that the user wishes to retain for future reference. The private directory 410 provides several uses.

First, the private directory 410 can store cards for businesses or business personnel that the user has conducted business with in the past and wishes to reuse in the future. In this usage, the private directory 410 serves as a personal rolodex for the user and can be used to store information about suppliers, manufacturers, partners, customer information, etc. Moreover, it provides the system with a direct indication of the businesses that are of most interest to the user. As such, whenever an update is made to the data of any business in the user's private directory, the system can provide an alert to the user. Alerts can also be provided whenever any change is made to a card that the user has liked or approved or a card that the user has previously viewed. The alert directs the user to the card or cards having the updates. In some embodiments, the updated information can be highlighted or otherwise distinguished from the other information of the card. The alert can be an email to the user or a prompt that appears as part of the user deck presentation. In some embodiments, the user can specify which data fields it would like to receive alerts on. In some such embodiments, the user is not alerted for every data update, but is updated for the data that is of most interest to the user.

Second, the private directory 410 can be used to store cards for potential customers or businesses that the user may want to engage with in the future. As such, the private directory 410 can be used as a lead list and can be shared with other users.

Third, the private directory 410 can be used to fine tune the customizations and future card selections made by the system for the user. Specifically, the system references the cards placed in the user's private directory 410 in order to identify other cards that are related or similar for future presentation to the user.

Fourth, the rating or value for any card, business, or business personnel entered to the user's private directory 410 is increased. The increased rating or value will improve the chances that the card will be selected and presented in the customized card deck of other users. In some embodiments, the upward flick can be a user interaction that affirmatively approves or otherwise endorses the business or business representative identified by the first card 310.

To reference cards within the user's private directory, the user simply touches the directory icon at the top of the display interface (see reference marker 410). In some embodiments, the user can create subdirectories within the private directory to categorize the cards therein. Once in the private directory, the user can perform a press and hold to create a new subdirectory. Then drag and drop the cards from the private directory to any of the subdirectories.

The user can also flick the first card 310 down to reject the card. The user may reject a card because the user had a poor experience with the identified business, the user has no interest in the business or the goods and services of the business, or the user otherwise dislikes or disapproves of the business. Rejecting the card has several implications. First, the card will not be presented again to the user and therefore will be removed from the customized set of cards selected for the user. Second, rejecting the card affects what other cards are included in the set of cards to be presented to the user. Rejecting a specific card can cause cards for other similar businesses to be removed from the user's customized card deck. Third, rejecting the card lowers its value, thereby decreasing the likelihood that it will be included in the customized deck produced by the system for other users.

FIG. 5 illustrates a press and hold card interaction 510 and the some additional functionality that the interaction makes available in accordance with some embodiments. One such feature is the referral of a card to another user. After a user presses and holds card 310, selects the referral option 520, and enters the name or email of the other user, the system sends the card to the identified other user. This allows users to provide leads, recommend, and suggest a business to another. Once the card is entered into the deck of the referred to user, the referred to user will be provided an alert the next time he accesses his deck notifying the user of the newly referred card. The alert can also indicate who referred the card and notes from the referring user. Another feature available from the press and hold interaction 510 is the rating menu 530. After pressing and holding a card and selecting the rating feature 530, the user can then enter a rating for the business identified by the selected card and further comment on the business. The rating and comments are then recorded as part of the card and can be presented to other users that access that card. The rating and comment data can also be entered into the big data repository and used in valuing the card in the future. A third possible feature made available from the press and hold interaction 510, are icons 540 with which the user can quickly and alternatively indicate whether the user approves or disproves of the business represented by the card.

Figure 6:
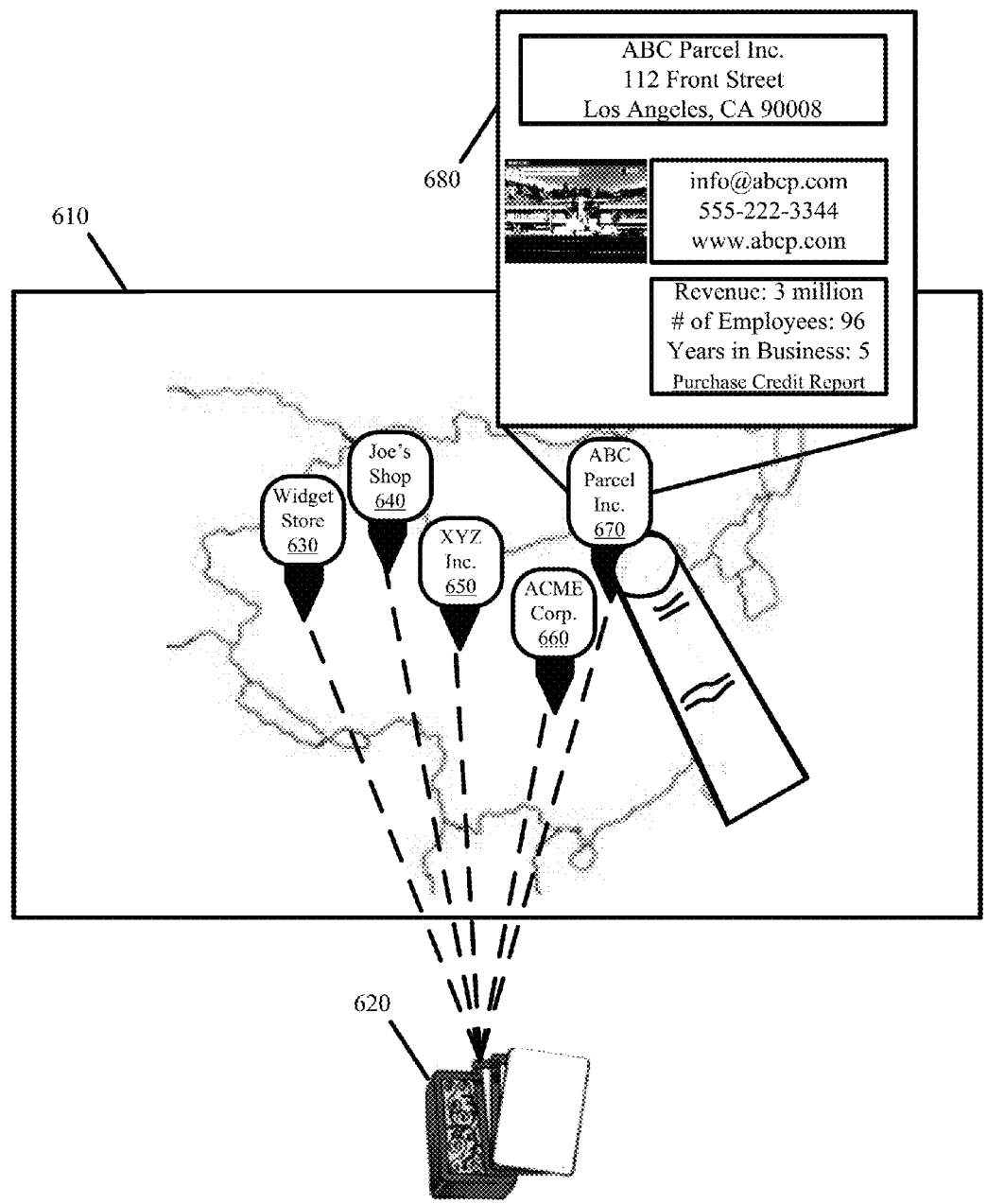
FIG. 6 presents an alternative model by which some embodiments present cards from a user deck to the corresponding user.

FIG. 6 presents an alternative model by which some embodiments present cards from a user deck to the corresponding user. The user interface 610 initially presents a map to a user. The user can manipulate the map to select a region that he/she is interested in. Alternatively, the user can enter a location (e.g., zipcode, city, etc.) or the map can automatically be selected based on the user's current location. In any case, once a region is selected, the system searches the card deck 620 that is generated for the user and identifies the cards from that deck 620 that identify businesses or business personnel within the selected region. The system then places indicators 630, 640, 650, 660, and 670 over the map at the location of each identified business or business personnel. Each indicator 630-670 can present an image or summary information from a card for the business or business person at that location. Each indicator 630-670 can also be selected such that the selection of an indicator causes the system to provide a full view of the card for the business or business person at the location of the selected indicator. In this figure, the user selects indicator 670 and the interface is changed to present the full view of card 680.

As noted above, each deck of cards is customized on a per user basis. The system customizes each user deck using a two pronged approach that involves user customizations and system customizations. User customizations are based on information that the user provides in registering an account or providing search criteria. When using the application or website, the user is provided the option to register an account. Account registration involves the user creating a login that can be used to uniquely identify the user. Account registration further involves the user configuring various preferences for the objective and subjective data that it wants to be included in its customized card deck and for the businesses and business personnel to be included in its customized card deck.

FIG. 7 presents an exemplary interface 700 with which a user can specify user customizations for the businesses or business personnel and the objective and subjective data that the user is interested in. Specifically, section 710 of the interface 700 is used to specify the preferences for the businesses to include in the user's customized card deck. These preferences include geographic qualifications, industry classifications, financial qualifications, and rating qualifications as some examples. The geographic qualifications can restrict the customized deck of cards to present business data about businesses that operate or have a presence in one or more geographic regions (e.g., country, state, city, zipcode, etc.). The industry classifications can restrict the customized deck of cards to present data about businesses that operate within certain industries or sectors. The industries or sectors can be specified using Standard Industry Classification (SIC) codes, North American Industry Classification System (NAICS) codes, or textual identifiers. The financial qualifications can restrict the customized set of base-business cards to include businesses with certain financial criteria including revenue, debt, and income as some examples. The rating qualifications can restrict the customized set of base-business cards to include businesses that have been rated at a certain level by others.

Section 720 of the interface 700 is used to specify the user customizations for the business personnel to include in the user's customized card deck. Section 730 of the interface 700 is used to specify the user customizations for the objective data and subjective data that is to be included in each card of a given user deck. Specifically, these preferences customize the layout and presentation of the base-business cards on a per user basis such that the card identifying the business can provide different objective and subjective data for that business to a first user than to a second user, wherein the first user values a different set of objective and subjective data than the second user.

The user preferences specified as the user customizations as well as the user's private directory are tied to the user account such that whenever the user logs in to the website or application, the preferences and private directory entries are carried over without the user having to reconfigure them. The user can also be automatically logged upon initializing the website or application.

The user can still access a customized set of cards without logging in and without creating an account by providing the preferences as search criteria. If the user does not login and does not provide search criteria, the system provides the user with the highest valued cards as a default set, wherein card values are described in the section below relating to the system customizations.

As noted above, system customizations are also used to customize a user deck. System customizations compliment the user customizations and are used to update the selection of businesses and business personnel included in the deck and the ordering of cards in the deck.

In some embodiments, the system customizations are derived automatically by monitoring user behavior, monitoring user card interactions, and determining data availability. Based on the user behavior, user card interactions, and data availability, the system assigns a value to each card to represent its relevant importance to a given user. The values are continually updated as different cards gain interest and others lose interest.

An example is now provided to illustrate how values are assigned. While monitoring user behavior, the system determines that users spend the most amount of time viewing cards for restaurants providing Italian cuisine and little time viewing cards for restaurants providing French and American cuisine. Based on this monitored user behavior, the system assigns a higher value to the cards representing Italian restaurants. User decks that include cards for restaurants will include a greater number of cards for Italian restaurants and the cards having the highest values are presented first from within the deck.

Figure 8:
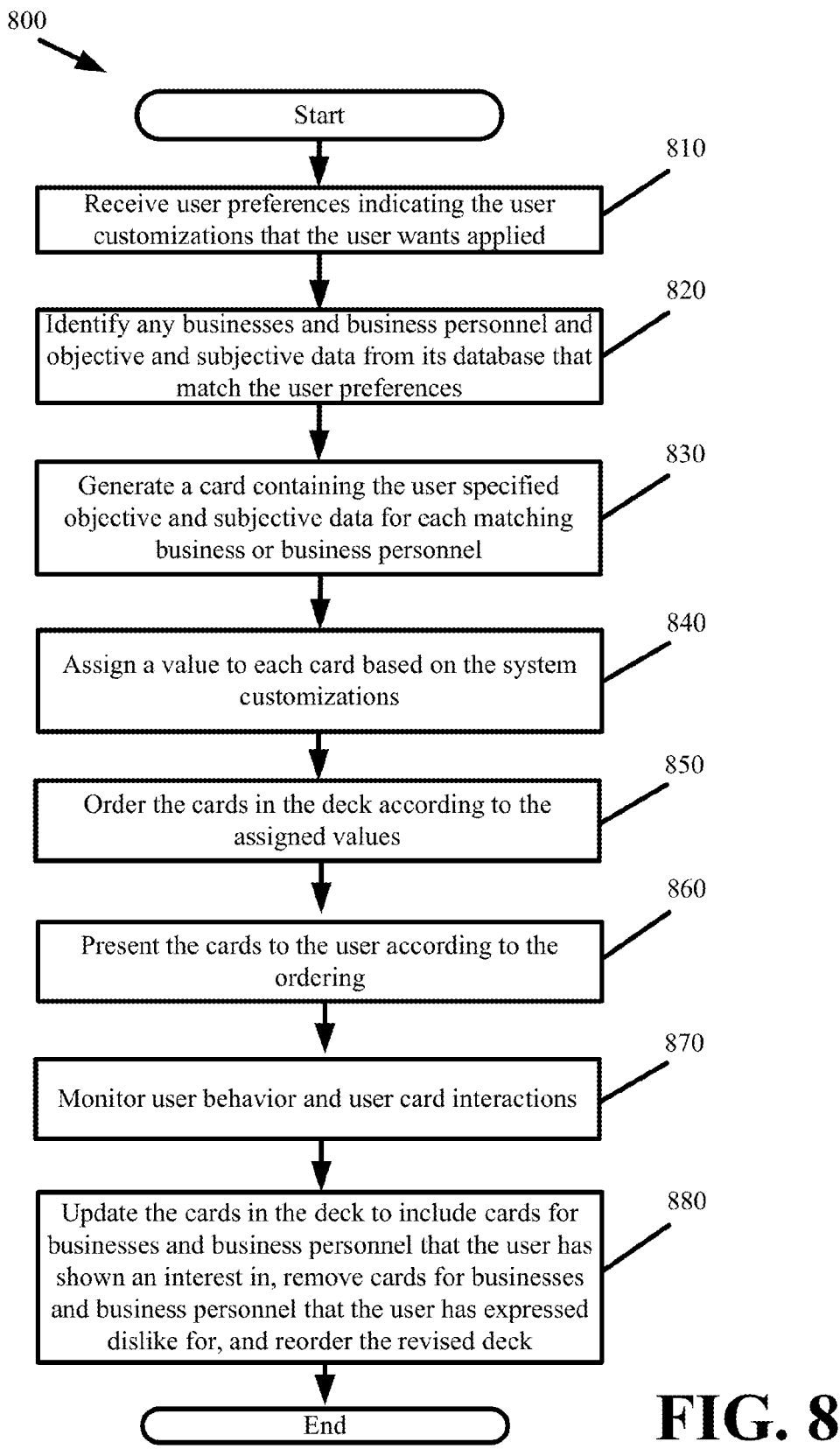
FIG. 8 presents a process for generating a custom card deck for a user in accordance with some embodiments.

FIG. 8 presents a process 800 for generating a custom card deck for a user in accordance with some embodiments. The process 800 commences by the system receiving (at 810) user preferences indicating the user customizations that the user wants applied. The process then identifies (at 820) any businesses and business personnel and objective and subjective data from its database that match the user customizations. The process generates (at 830) a card containing the user specified objective and subjective data for each matching business or business personnel. The process assigns (at 840) a value to each card based on the system customizations, orders (at 850) the cards in the deck according to the assigned values, and then presents (at 860) the cards to the user according to the ordering. The process continues monitoring (at 870) user behavior and card interactions, especially the user behavior and card interactions by the user viewing the deck. The process then updates (at 880) the cards in the deck to include cards for businesses and business personnel that the user has shown an interest in, remove cards for businesses and business personnel that the user has expressed dislike for, and reorder the revised deck to prioritize the presentation for the businesses and business personnel that are of most interest to the user.

The system derives the user behavior aspect of the system customizations in part from user viewership of the cards. Viewership is an indicator of the interest that users attribute to a card or the business or business representative represented by the card. When a particular card is presented to any user, the system monitors the time the user spends viewing the card. The longer the viewership, the greater the value that the system attributes to the card. The shorter the viewership, the lesser the value that the system attributes to the card. The value assigned to a card based on the user viewership can be derived based on the amount of time a user views a card relative to a threshold. The threshold can be predefined or can be dynamically computed based on the aggregate average time a user spends on each card. Viewership is computed from when a user flicks to place a particular card in focus to when the user flicks away from the card or closes the application or session.

User card interactions are also an aspect of the system customizations used to assign a value to a card. If a user immediately flicks away a first card to present a second card and spends several seconds viewing the second card before rejecting the second card with a downward flick, the system will attribute a greater value to the first card than the second card because the first card may have not been relevant to the user, whereas the second card was relevant but for some reason the user affirmatively disapproved of the business identified by the second card with the downward flick. Similarly, a user may spend several seconds viewing a first card before flicking away to present a second card and immediately add the second card to the user's private directory with an upward flick. In this example, even though the second card was viewed for less time than the first card, the user affirmatively approved the business of the second card by adding it to the private directory. Consequently, the second card is provided a higher value relative to the first card because of the affirmative approval by the user of the business represented by the second card. Thus, the system will increase a particular card's value based on the number of different users that have included that particular card into their private directory. Other monitored user card interactions include whether the user refers a card to another user, rates a card, reviews a card, or selects a like or dislike function on a card. Each referral of a particular card increases that particular card's value because it indicates that the referring user trusts, approves, or otherwise wants other users to consider the business being referred. When a user adds a rating to a card, the value of the card is adjusted according to the rating value. A five out of five star rating would increase the card's value. Similarly, when a user adds a review to a card, the value of the card is adjusted according to any positivity or negativity that is expressed in the card.

In some embodiments, data availability is another aspect of the system customizations used in assigning values to the different cards in a user deck. In some such embodiments, the value of a card is adjusted based on the completeness of the data set from which the card is generated. If the system lacks certain subjective or objective data for a business or business representative represented by a card, the system lowers that card's value. If a complete set of subjective and objective data is available, then the value of the card is increased. In some embodiments, the value derived from data availability is also adjusted depending on whether the available data is verified or not.

Verification can be performed by third parties, by corroborating the information obtained from a first data source with information that is obtained from a different second data source, or by obtaining the data from a trusted data source. For example, the value of a first card is decreased if the data within the card is wholly obtained from the business's own site, whereas the value of a second card is increased if the data within the card is obtained from the business's own site and corroborated with data from a trusted third party.

Verification can also be performed directly with the business or business personnel for which data is lacking. This allows the business or business person an opportunity to cure the deficiency prior to incurring a card value penalty. In such instances, the system submits a card of a particular business or particular business person with some lacking data elements to the deck of that particular business or particular business person. The particular business or particular business person can then enter the missing data using the various card interactions provided by the system. The system stores the obtained data and uses the obtained data to populate the corresponding data fields when generating the card for other users and when valuing the card. In some embodiments, the system also tracks which users provided which information to create an audit trail. The audit trail can be used to identify the source for each data element of a card. In some embodiments, the verification can be initiated when a system agent visits a business for which data is lacking. The system agent refers the card for that business over to the business at which point the missing data is collected on-site and verified with the appropriate business representatives.

The system computes a default value for each card based on the system customizations observed for the user population as a whole and the data availability. In other words, the system increases or decreases the default value of a particular card based on the total time different users spend viewing that particular card. Similarly, the system increases or decreases the default value of a particular card based on how many users add that particular card to their private directory, approve the card, reject the card, or provide a positive or negative review for the card.

The default values are starting points for customizing card decks. In some embodiments, the system selects cards with the highest default values to include in the decks of users that have not created an account and have not provided search criteria. For each particular user that has created an account, the system adjusts the default values to bias them according to observed behavior and interactions by the particular user as well as any preferences that were specified by that user. For example, if a particular user has added several cards that identify small businesses (e.g., businesses with fewer than fifty employees) into his private directory and has rejected cards that identify large business (e.g., greater than fifty employees), then the system will adjust the card values such that the value for any cards identifying a small business is increased for that particular user while the value for any cards identifying a large business is decreased for that particular user.

Based on the adjusted values, the system can better customize the deck for the user. The system can periodically add cards to the deck with high adjusted values that were previously left out of the deck and can periodically remove cards from the deck with adjusted values that are lower than the default values. Additionally, the system can reorder the presentation of cards from the deck based on the adjusted values such that the cards with the highest adjusted values are presented first to the user. Based on these adjustments, it should be evident how one card can have different values for different users. Moreover, the system customizations that are realized through the adjusted card values allows the system to continually fine tune and customize the data that it presents to a user without the user having to initiate new searches or refine searches in order to receive the data.

Figure 9:
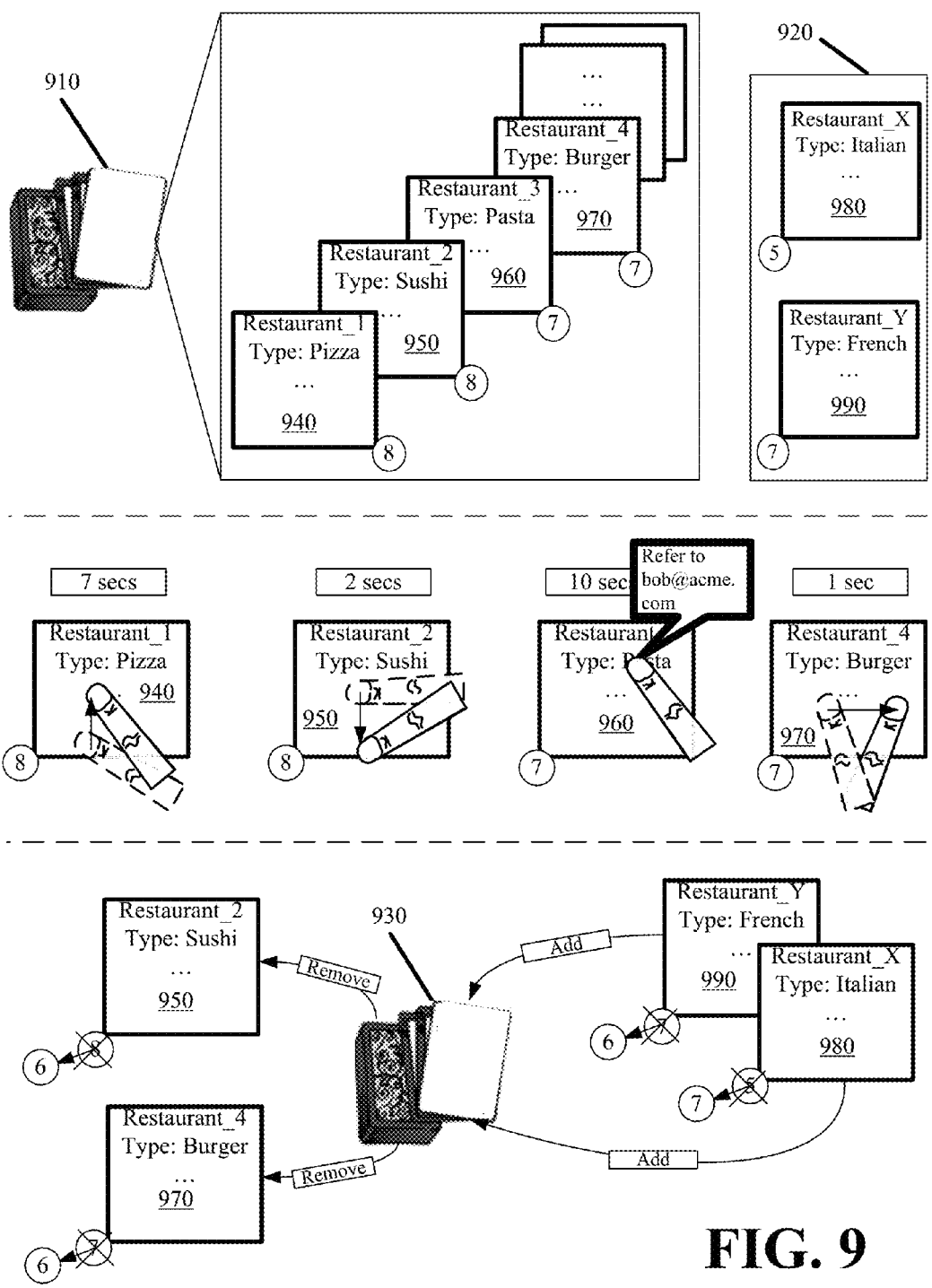
FIG. 9 illustrates customizing a user deck by adjusting default card values as a result of monitoring user behavior and card interactions in accordance with some embodiments.

FIG. 9 illustrates customizing a user deck by adjusting default card values as a result of monitoring user behavior and card interactions in accordance with some embodiments. The figure illustrates an initial deck 910 that is customized for the user, additional cards 920 that were left out of the initial deck 910, and a subsequent customization of the initial deck 930 after the system monitors the user's behavior and card interactions for some time.

The initial deck 910 includes cards identifying restaurants with the highest default values that best match user specified preferences. The default values can be seen adjacent to each card. As before, the default values are computed based on data availability for each restaurant and based on aggregate user behavior and card interactions that all users have with respect to the cards.

The system monitors the user viewership and card interaction with four of the cards in the initial deck 910. Specifically, the user views a first card 940 identifying a pizza restaurant for seven seconds and ultimately adds the first card 940 to the user's private directory with an upwards flick. The user views a second card 950 identifying a sushi restaurant for two seconds before affirmatively disproving or disliking that card 950 with a downwards flick. The user views a third card 960 identifying a pasta restaurant for ten seconds and interacts with the card 960 to refer that card to another user. The user views a fourth card 970 identifying a hamburger restaurant for one second before flicking away.

Based on the viewership and interaction by the user, the system adjusts the default values. The system observes that the user is interested in Italian cuisine. Therefore, the system increases the default values of cards identifying Italian restaurants and decreases the default values of card identifying all other restaurants.

Accordingly, the subsequent customization of the initial deck 930 replaces the second card 950 and the fourth card 970 with a fifth card 980 for another Italian restaurant and a sixth card 990 for a non-Italian restaurant that is assigned a high value even after the value adjustment. Moreover, the deck 930 maybe reordered according to the adjusted values.

Some embodiments also bias the values used to customize cards for a particular user deck according to observed behavior and interactions of friends, associates, or partners of the particular user. The user identifies which friends, associates, or partners he/she wishes to influence the user's deck during registration. Thereafter, the system provides the particular user with cards that act to identify leads that are relevant based on the user's own network. This mimics how people obtain referrals in the real world. A person trusts recommendations provided by his or her friends, associates, and partners. The system described herein simplifies the recommendation process by eliminating the need for the user to request the recommendation from his or her friends, associates, and partners. Instead, the system monitors the behavior and card interactions of the user's friends, associates, and partners and automatically includes cards for businesses and business personnel approved by friends, associates, and partners in the user's deck. More specifically, based on the monitored behavior and card interactions of the friends, associates, and partners, the system adjusts the card values for the user, thereby increasing the influence those parties have on the businesses and business personnel that are selected for presentation through the user's card deck.

Some embodiments incorporate a social networking element with the base-business cards. In some such embodiments, a user can identify its friends or partners either through the user preferences or by adding cards for the friends or partners to the user's private directory. Thereafter, the system further adjusts the values used to customize a user's deck based on observed behavior and interactions of the friends or partners or, alternatively, based on the values that the system derives for the friends or partners. In this manner, the system is able to not only present cards for businesses and business personnel that are relevant to the user, but also cards for businesses and business personnel that are recommended or otherwise preferred by the friends or partners. User behavior and card interaction can also be used to generate updates on social network sites such as LinkedIn or Facebook. Additionally, the cards entered to a user's private directory can be shared across these and other social network sites.

Figure 10:
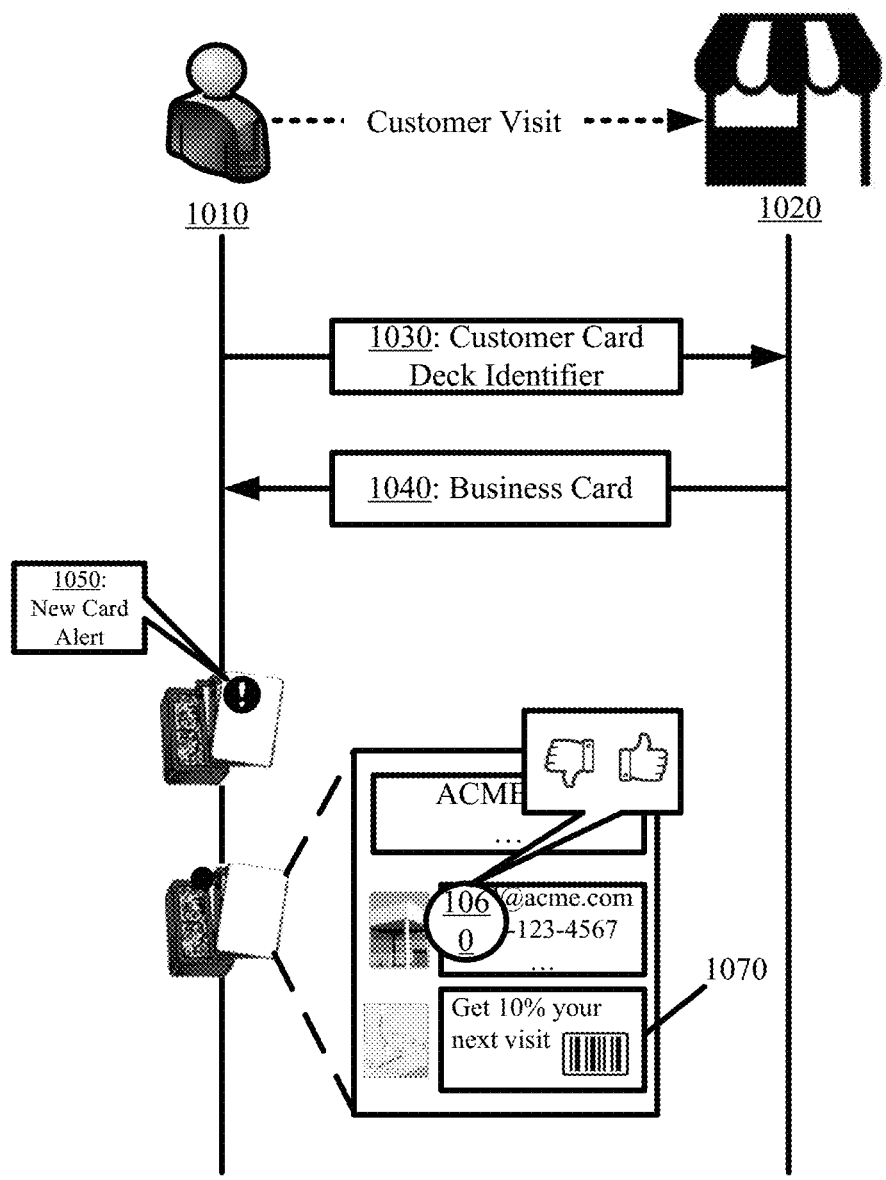
FIG. 10 illustrates an exemplary use case whereby the base-business cards of some embodiments are used to promote customer-to-business and business-to-customer interactions.

The social networking element is extended in some embodiments to promote customer-to-business and business-to-customer interactions. FIG. 10 illustrates an exemplary use case whereby the base-business cards of some embodiments are used to promote customer-to-business and business-to-customer interactions.

The use case involves a customer 1010 that visits a business 1020. The visit can result in the sale of a good or service or can conclude without a completed transaction. At some point during the visit, the customer or the system of some embodiments provides (at 1030) the business with a card of that customer, the customer's email address, or the customer's username used in identifying that customer's card deck within the system of some embodiments. In some embodiments, the customer may operate a network device that automatically checks itself in with the business when the customer enters the business, wherein as part of the check-in the device conveys the customers email address, username, or customer card to the business.

The business forwards (at 1040) its own card to the customer (i.e., to the customer's card deck) using the obtained email address, username, or customer card. The next time the customer accesses his deck, the card for the visited business will appear or an alert will be issued (at 1050) to the customer notifying him of the card forwarded by the business.

The customer can then submit (at 1060) a review of the business directly through interactions with that business's card. Any such review gets appended to the business's card such that the review appears the next time the customer retrieves that business card or the review appears to all other users that at some subsequent time view that business card. The review can also be forwarded from the card to other review sites. Alternatively, the customer can approve of the business by "liking" the card or adding the card to the customer's private directory or disapprove of the business by rejecting the card. In this manner, the cards promote business interactions with customers even after the customers' visits are complete.

In some embodiments, the system may allow the business the ability to send additional or custom information with its card. For example, after the customer visits the business, the business may forward its own card to the customer's card deck with a coupon or promotion 1070 that the customer can use on a subsequent visit. The customer can present the business card with the embedded coupon or promotion 1070 during his next visit to the business in order to redeem it.

Many of the above-described processes and components are implemented as software processes that are specified as a set of instructions recorded on a non-transitory computer-readable storage medium. When these instructions are executed by one or more computational element(s) (such as processors or other computational elements like ASICs and FPGAs), they cause the computational element(s) to perform the actions indicated in the instructions, thereby transforming a general purpose computer to a specialized machine implementing the methodologies and systems described above. Computer and computer system are meant in their broadest sense, and can include any electronic device with a processor including cellular telephones, smartphones, portable digital assistants, tablet devices, laptops, desktops, and servers. Examples of computer-readable media include, but are not limited to, CD-ROMs, flash drives, RAM chips, hard drives, EPROMs, etc.

Figure 11:
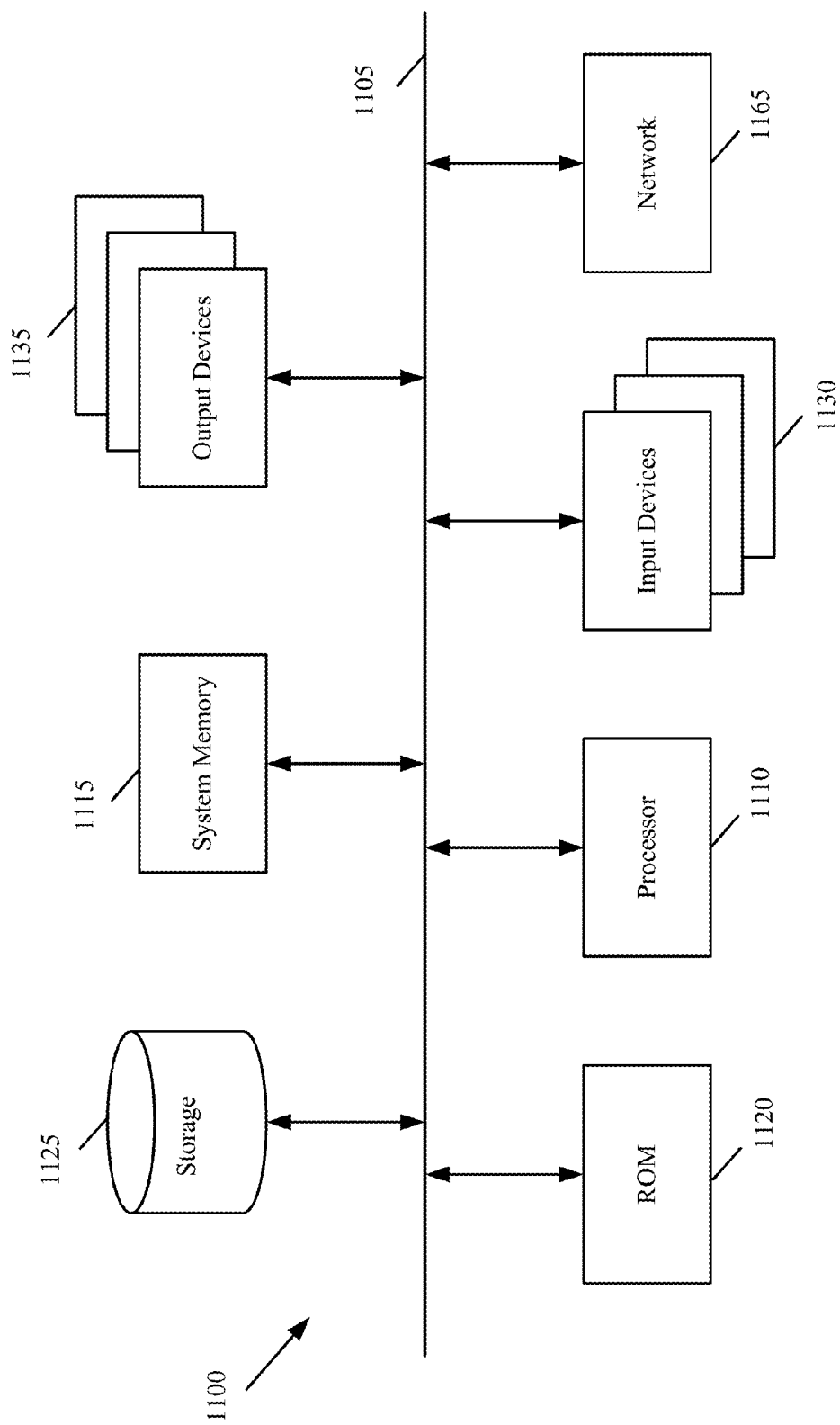
FIG. 11 illustrates a computer system with which some embodiments are implemented.

FIG. 11 illustrates a computer system with which some embodiments of the customized card generation system and its components are implemented. Such a computer system includes various types of computer-readable mediums and interfaces for various other types of computer-readable mediums that implement the various processes, modules, and systems described above. Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the invention. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device Like the permanent storage device 1125, the system memory 1115 is a read-and-write memory device. However, unlike the storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include any of a capacitive touchscreen, resistive touchscreen, any other touchscreen technology, a trackpad that is part of the computing system 1100 or attached as a peripheral, a set of touch sensitive buttons or touch sensitive keys that are used to provide inputs to the computing system 1100, or any other touch sensing hardware that detects multiple touches and that is coupled to the computing system 1100 or is attached as a peripheral. The input devices 1130 also include alphanumeric keypads (including physical keyboards and touchscreen keyboards), pointing devices. The input devices 1130 also include audio input devices (e.g., microphones, MIDI musical instruments, etc.). The output devices 1135 display images generated by the computer system. The output devices include printers and display devices, such as cathode ray tubes (CRT) or liquid crystal displays (LCD).

Finally, as shown in FIG. 11, bus 1105 also couples computer 1100 to a network 1165 through a network adapter (not shown). In this manner, the computer can be a part of a network of computers such as a local area network ("LAN"), a wide area network ("WAN"), or an Intranet, or a network of networks, such as the internet. For example, the computer 1100 may be coupled to a web server (network 1165) so that a web browser executing on the computer 1100 can interact with the web server as a user interacts with a GUI that operates in the web browser.

As mentioned above, the computer system 1100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A touch controlled system for interacting with and customizing business information within a graphical user interface (GUI), the system comprising:
   a touch sensing display presenting within the GUI, a continually updated plurality of cards in response to user interactions with the plurality of cards, wherein each card of the plurality of cards presents a different business of a set of businesses when provided focus in the GUI; and
   a processor:
   (a) refreshing the touch sensing display to present different cards from the plurality of cards in response to user horizontal swipe gestures;
   (b) monitoring an amount of time the user views each card of the plurality of cards as a result of the amount of time each card is provided focus in the GUI;
   (c) detecting a first touch-based gesture issued on a first card from the plurality of cards while the first card is displayed in the GUI, wherein the processor adds the first card to a user directory in response to the first touch-based gesture, the first card presenting a first business from the set of businesses;
   (d) detecting a second touch-based gesture issued on a second card from the plurality of cards while the second card is displayed in the GUI, wherein the processor sends a second business identified by the second card as a recommendation to another user in response to the second touch- based gesture; and
   (e) customizing the plurality of cards presented within the touch sensing display, wherein the customizing comprises (i) removing a third card from the plurality of cards presenting a third business from the set of businesses when the amount of time the user views the third card is less than the amount of time the user views other cards of the plurality of cards, (ii) adding a fourth card to the plurality of cards presenting a fourth business in response the first touch-based gesture, wherein a subset of business data of the fourth business matches a subset of business data of the first business, and (iii) adding a fifth card to the plurality of cards presenting a fifth business in response to the second touch-based gesture, wherein a subset of business data of the fifth business matches a subset of business data of the second business.

2. The system of claim 1 further comprising detecting a third touch-based gesture with which a friend of the user disapproves a sixth card of a different plurality of cards presented to the friend, wherein the sixth card identifies a sixth business from the set of businesses.

3. The system of claim 2, wherein the customizing further comprises removing the sixth card from the plurality of cards presented to the user in response to the disapproval of the sixth business based on the third touch-based gesture performed by the friend of the user.

4. The system of claim 1, wherein the processor further alerts the user to a change in business data of a sixth card of the plurality of cards by distinguishing presentation of the sixth card from other cards of the plurality of cards in the interactive interface.

5. The system of claim 1, wherein the processor further detects a third touch-based gesture issued over a sixth card from the plurality of cards while the sixth card is displayed in the GUI, the third touch-based gesture comprising entry of a positive review or a positive ranking about a sixth business.

6. The system of claim 5, wherein the customizing further comprises adding a seventh card to the plurality of cards presenting a seventh business in response to the third touch-based gesture, wherein a subset of business data of the seventh business matches a subset of business data of the sixth business.

* * * * *